US008850246B2

(12) United States Patent
Lee et al.

(10) Patent No.: US 8,850,246 B2
(45) Date of Patent: Sep. 30, 2014

(54) DISPLAY APPARATUS AND CONTROL METHOD THEREOF

(75) Inventors: Sang-hoon Lee, Suwon-si (KR); Myoung-jun Lee, Bucheon-si (KR); Tae-hoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 296 days.

(21) Appl. No.: 13/399,700

(22) Filed: Feb. 17, 2012

(65) Prior Publication Data

US 2012/0299941 A1 Nov. 29, 2012

(30) Foreign Application Priority Data

May 23, 2011 (KR) ........................ 10-2011-0048384

(51) Int. Cl.

| | |
|---|---|
| ***G06F 1/32*** | (2006.01) |
| ***G06F 1/00*** | (2006.01) |
| ***H04M 1/00*** | (2006.01) |
| ***G09G 5/00*** | (2006.01) |
| ***G09G 3/34*** | (2006.01) |

(52) U.S. Cl.

CPC ........ *G09G 3/3406* (2013.01); *G09G 2330/021* (2013.01); *G09G 2320/0626* (2013.01)

USPC ............ 713/320; 713/324; 455/574; 345/581

(58) Field of Classification Search

CPC ............................ G09G 3/3406; G06F 1/3212

USPC .................... 713/320, 324; 455/574; 345/581

See application file for complete search history.

(56) References Cited

U.S. PATENT DOCUMENTS

| | | | | |
|---|---|---|---|---|
| 5,142,684 | A * | 8/1992 | Perry et al. | 713/320 |
| 5,386,577 | A * | 1/1995 | Zenda | 713/340 |
| 5,894,580 | A * | 4/1999 | Yoshida | 713/340 |
| 6,697,953 | B1 * | 2/2004 | Collins | 713/320 |
| 7,886,169 | B2 * | 2/2011 | Chen et al. | 713/320 |
| 2006/0022992 | A1 * | 2/2006 | Tsuji et al. | 345/589 |
| 2009/0109246 | A1 * | 4/2009 | Oh | 345/690 |
| 2010/0317408 | A1 | 12/2010 | Ferren et al. | |

FOREIGN PATENT DOCUMENTS

| | | | |
|---|---|---|---|
| EP | 2287831 | A1 | 2/2011 |
| KR | 10-2007-0040452 | A | 4/2007 |
| KR | 10-2007-0066290 | A | 6/2007 |

OTHER PUBLICATIONS

Communication dated Mar. 19, 2012 issued by the European Patent Office in European Application No. 12150250.4.

* cited by examiner

*Primary Examiner* — Stefan Stoynov

(74) *Attorney, Agent, or Firm* — Sughrue Mion, PLLC

(57) ABSTRACT

A display apparatus and a method thereof including: a display unit which displays an image based on a video signal; a battery unit which supplies battery power; and a controller which controls adjusts brightness of the image based on residual quantity of the battery unit when the battery power is supplied.

19 Claims, 7 Drawing Sheets

DISPLAY APPARATUS AND CONTROL METHOD THEREOF

CROSS-REFERENCE TO RELATED APPLICATION

This application claims priority from Korean Patent Application No. 10-2011-0048384, filed on May 23, 2011 in the Korean Intellectual Property Office, the disclosure of which is incorporated herein by reference in its entirety.

BACKGROUND

1. Field

Apparatuses and methods consistent with the exemplary embodiments relate to a display apparatus and a control method thereof, and more particularly, to a display apparatus which can effectively use battery power when operating with the battery power and a control method thereof.

2. Description of the Related Art

A notebook personal computer (PC), a tablet PC, a mobile phone, a smart phone, a smart pad, or the like display apparatus displays an image based on a video signal. Such a display apparatus may operate with predetermined direct current (DC) power converted from input alternating current (AC) power (hereinafter, referred to as 'external power'), or DC power from a battery mounted thereto (hereinafter, referred to as 'battery power').

In a related art display apparatus using the external power or the battery power to operate, the display apparatus is automatically switched to use the battery power when the external power is cut off, thereby keeping its operation. While using the battery power, the display apparatus may restrict the brightness of an image in order to minimize power consumption. For example, the brightness of an image in the case of using the battery power may be set up to be lower than that in the case of the external power.

However, in the related art when using the battery power, the brightness stays constant regardless of residual quantity of the battery. For example, the power may be consumed by force even when the battery lacks its residual quantity. Thus there is a problem that the display apparatus is ineffectively operated when used on battery for a long time.

SUMMARY

Accordingly, one or more exemplary embodiments provide a display apparatus and a control method thereof, in which residual quantity of a battery is monitored to control the brightness of an image in the display apparatus and extend an operating time of the display apparatus.

Another exemplary embodiment is to provide a display apparatus and a control method thereof, in which an operating time of a display apparatus is further extended by operating only an audio device and not a video device when residual quantity of a battery decreases to a predetermined low level.

The foregoing and/or other aspects may be achieved by providing a display apparatus including: a display unit which displays an image based on the video signal; a battery unit which supplies battery power; and a controller which adjusts brightness of the image in accordance with residual quantity of the battery unit when the battery power is supplied.

The display unit may include a signal processor which processes the video signal; and a backlight unit which provides light for displaying the image, the display unit displays the image based on the video signal processed by the signal processor, the controller control main power supplied to the signal processor and the display unit, the battery power assists the main power, and the controller may control the backlight unit to adjust the brightness of the image.

The controller may decrease the brightness of the image if the residual quantity of the battery unit is equal to or lower than a predetermined value.

The controller may control the battery power to be supplied if the main power is cut off.

If the residual quantity of the battery unit may be equal to or lower than a first predetermined value, power supplied to the display unit is shut off.

The display unit may include a backlight unit which provides light for displaying the image; and a display panel which displays the image, and the controller may individually shut off power supplied to the backlight unit and the display panel.

The controller may cut off power supplied to the signal processor if the residual quantity of the battery is equal to or lower than a second value lower than the first predetermined value.

The signal processor may further process an audio signal.

The display apparatus may further include a storage unit which stores a lookup table with information about the brightness of the image based on the residual quantity of the battery unit, the controller adjusts the brightness of the image with reference to the lookup table.

The information about the brightness of the image may include information about maximum brightness of the image, and the controller may control the brightness of the image not to exceed the maximum brightness based on the information about the maximum brightness of the image.

Another aspect may be achieved by providing a control method of a display apparatus, the method including: supplying battery power to a display unit as auxiliary power; and adjusting brightness of an image on the display unit based on residual quantity of a battery unit.

The method may include supplying main power to a signal processor and the display unit. The display unit may include a backlight unit which provides light for displaying the image, and the backlight unit may be controlled to adjust the brightness of the image.

The brightness of the image may be decreased if the residual quantity of the battery unit is equal to or lower than a predetermined value.

The battery power may be controlled to be supplied if the main power is cut off.

If the residual quantity of the battery unit is equal to or lower than a first predetermined value, power supplied to the display unit may be shut off.

The display unit may include a backlight unit which provides light for displaying the image; and a display panel which displays the image, and the controller may individually shut off power supplied to the backlight unit and the display panel.

If the residual quantity of the battery is equal to or lower than a second value lower than the first value, the power supplied to the signal processor may be cut off.

The signal processor may further process an audio signal.

The controller may adjust the brightness of the image with reference to a lookup table which contains information about the brightness of the image based on the residual quantity of the battery unit.

The information about the brightness of the image may include information about maximum brightness of the image, and the brightness of the image may be controlled not to exceed the maximum brightness based on the information about the maximum brightness of the image.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Below, exemplary embodiments will be described in more detail with reference to accompanying drawings.

Figure 1:
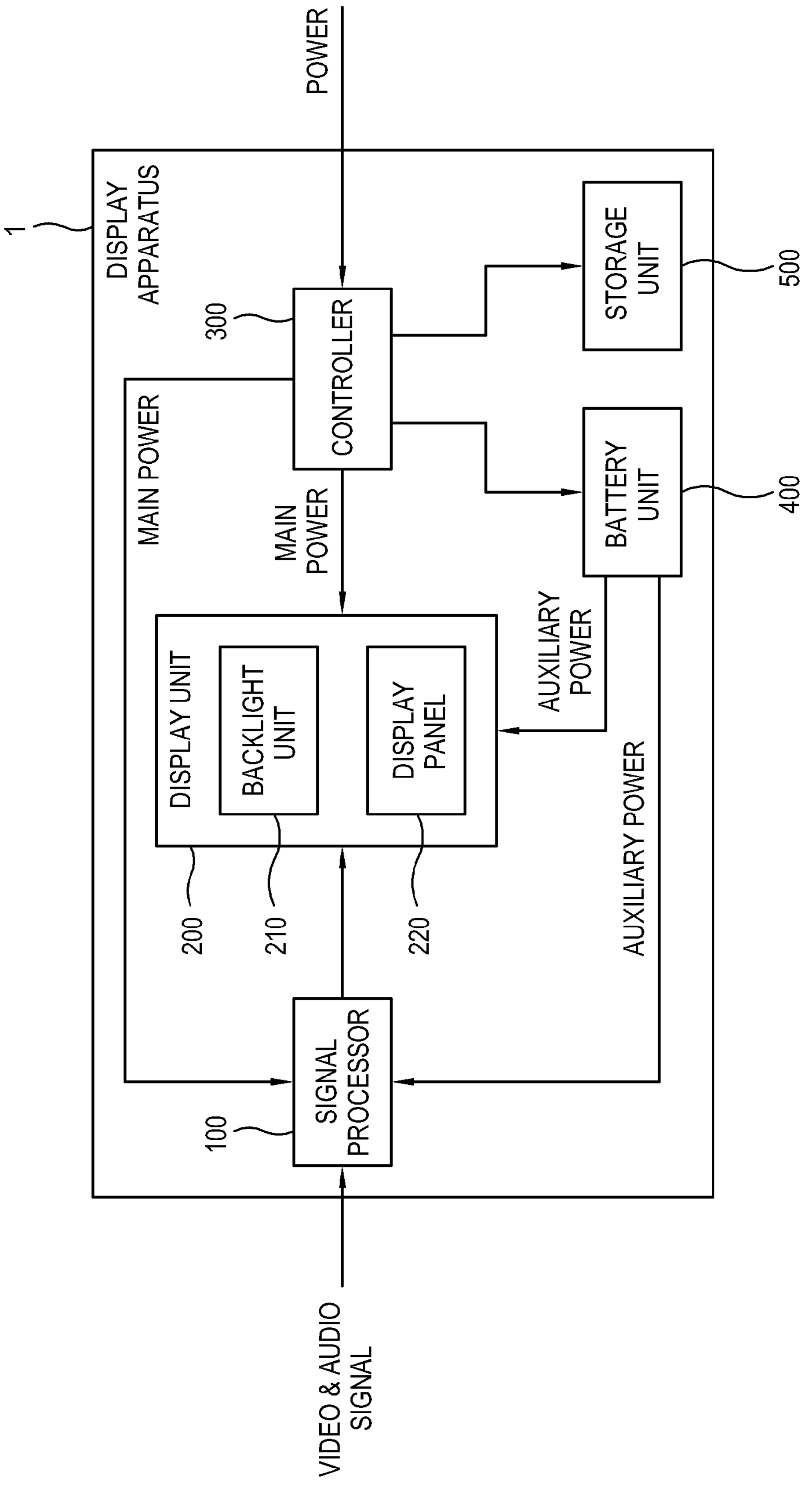
FIG. 1 is a block diagram of a display apparatus according to an exemplary embodiment.

FIG. 1 is a block diagram of a display apparatus according to an exemplary embodiment.

The display apparatus 1 shown in FIG. 1 is an apparatus for displaying an image based on a video signal, which may be achieved by a notebook personal computer (PC), a tablet PC, a mobile phone, a smart phone, a smart pad, or the like.

Referring to FIG. 1, the display apparatus 1 includes a signal processor 100, a display unit 200, a controller 300, a battery unit 400 and a storage unit 500. Also, the display unit 200 includes a backlight unit 210 and a display panel 220.

The signal processor 100 processes an input video signal and outputs it to the display unit 200. The display panel 220 of the display unit 200 displays an image based on a video signal received from the signal processor 100. The backlight unit 210 provides light for showing an image on the display panel 220. For example, the display panel 220 includes a liquid crystal display (LCD), and the backlight unit 210 includes a light emitting diode (LED).

The signal processor 100 is capable of processing an audio signal as well as a video signal, and outputs a processed audio signal to an audio device (not shown).

The controller 300 receives an AC power (hereinafter, referred to as 'external power') and converts it into predetermined DC power, i.e., main power, thereby supplying the main power to the signal processor 100 and the display unit 200. The controller 300 may control the power to be supplied to the whole of the display unit 200, or individually supplied to the backlight unit 210 and the display panel 220 of the display unit 200.

The battery unit 400 supplies power (hereinafter, referred to as 'battery power' or 'auxiliary power') for assisting the main power as predetermined DC power.

The display apparatus 1 may further include an input power sensor (not shown). The input power sensor senses an input state of the external power and generates and outputs a flag signal to the controller 300.

The controller 300 controls the auxiliary power of the battery unit 400 to be supplied to the display unit 200 and the signal processor 100 in order to keep the operation of the display apparatus 1 when the main power is cut off. If it is determined that the supply of the external power is cut off based on a flag signal from the input power sensor, the controller 300 determines that the main power is shut off.

Alternatively, even though the main power is normally supplied, the auxiliary power of the battery unit 400 may be supplied as necessary in light of design. Whether to supply the auxiliary power of the battery unit 400 when the main power is available may be determined by user settings for example.

When supplying the auxiliary power of the battery unit 400, the controller 300 may adjust the brightness of an image displayed on the display unit 200 in accordance with a residual quantity of the battery unit 400. For example, the controller 300 may control the backlight unit 210 to adjust the brightness of an image.

The controller 300 may decrease the brightness of light from the backlight unit 210 to be equal to or lower than a preset level if it is determined that the residual quantity of the battery unit 400 is equal to or lower than a predetermined critical quantity. The residual quantity of the battery unit 400 is detected on the basis of a current, a voltage, etc. on a circuit connected to the battery unit 400.

The storage unit 500 stores a lookup table that contains information about the brightness of an image corresponding to the residual quantity of the battery unit 400. The controller 300 adjusts the brightness of light from the backlight unit 210 with reference to the lookup table stored in the storage unit 500.

The lookup table stored in the storage unit 500 includes information about pulse width modulation (PWM) duty of the maximum usable auxiliary power (hereinafter, referred to as 'maximum brightness information of an image') within a predetermined residual quantity of the battery unit 400. For example, information about the PWM duty may be set to decrease the PWM duty of the auxiliary power if the residual quantity of the battery 400 decreases.

The controller 300 receives a brightness signal based on a video signal from the signal processor 100, and controls the brightness of light provided by the backlight unit 210 based on the received brightness signal. The controller 300 may limit the brightness of light provided by the backlight unit 210 by referring to the lookup table stored in the storage unit 500. For example, the controller 300 limits the brightness of light provided by the backlight unit 210 such that the brightness of the image obtained from the video signal cannot exceed the maximum brightness of an image set in the lookup table.

Figure 2:
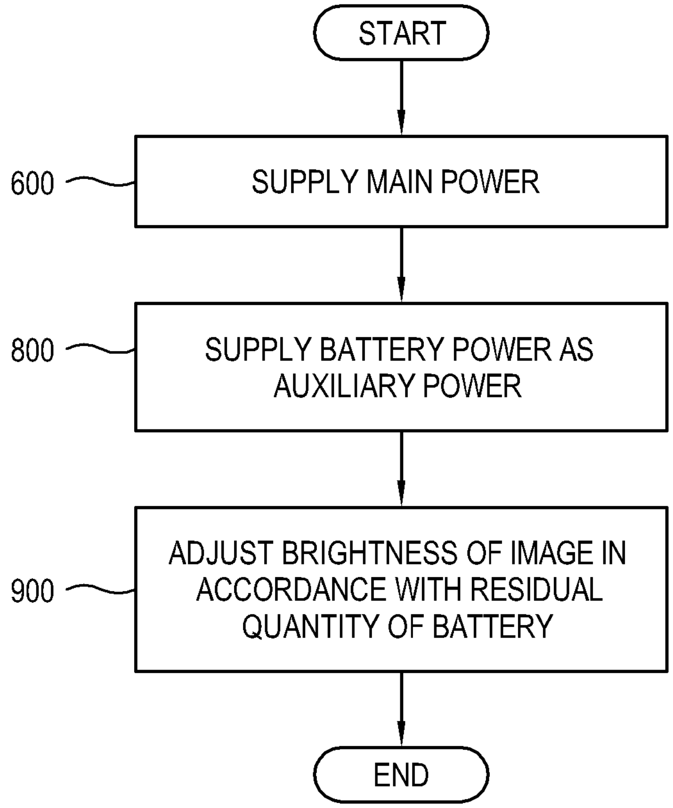
FIG. 2 is a flowchart of a control method for a display apparatus according to an exemplary embodiment.
Figure 3:
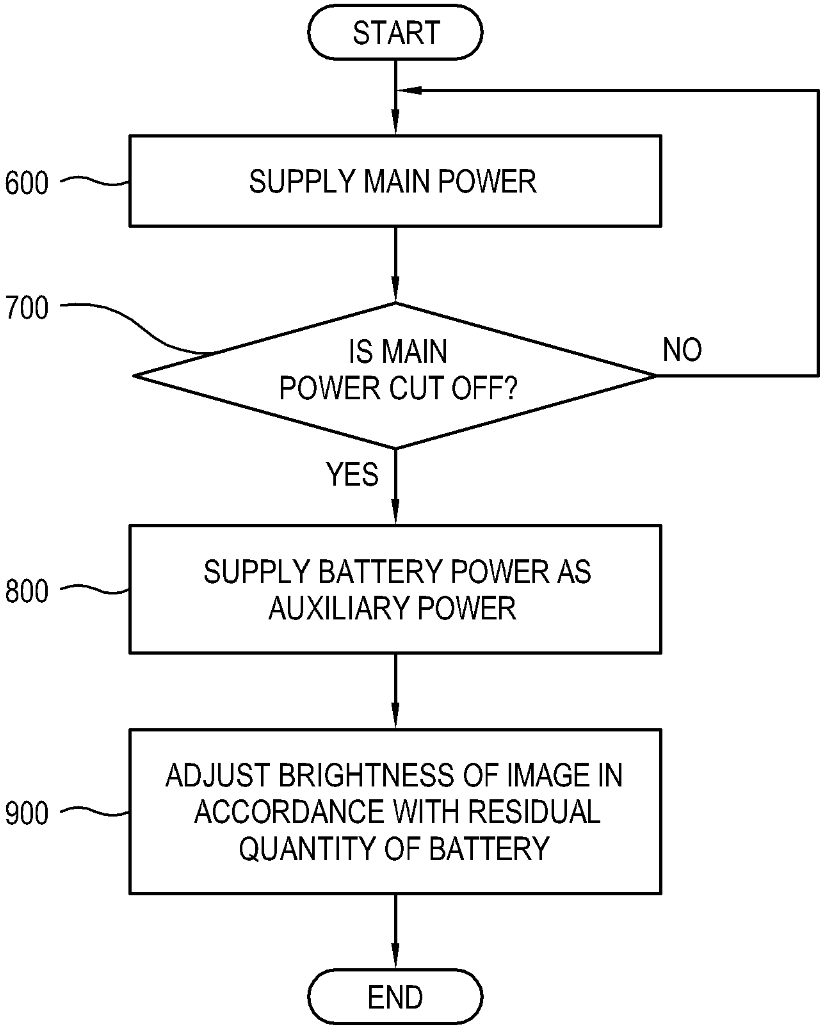
FIG. 3 is a flowchart of a control method for a display apparatus according to another exemplary embodiment.

FIG. 2 is a flowchart illustrating a method of controlling a display apparatus according to an exemplary embodiment, and FIG. 3 is a flowchart illustrating a method of controlling a display apparatus according to another exemplary embodiment.

Referring to FIG. 2, the controller 300 receives external power and supplies the main power to the signal processor 100 and the display unit 200 at operation 600. In the case where the power of the battery unit 400 is supplied as the auxiliary power to the signal processor 100 and the display unit 200 at operation 800, the brightness of an image on the display unit 200 is adjusted in accordance with the residual quantity of the battery unit 400 at operation 900.

Referring to FIG. 3, the controller 300 supplies the main power to the signal processor 100 and the display unit 200 at operation 600, and supplies the power of the battery unit 400 as the auxiliary power at operation 800 when the supply of the main power is shut off at operation 700. In this case, the brightness of an image on the display unit 200 is adjusted in accordance with the residual quantity of the battery unit 400 at operation 900.

Figure 4:
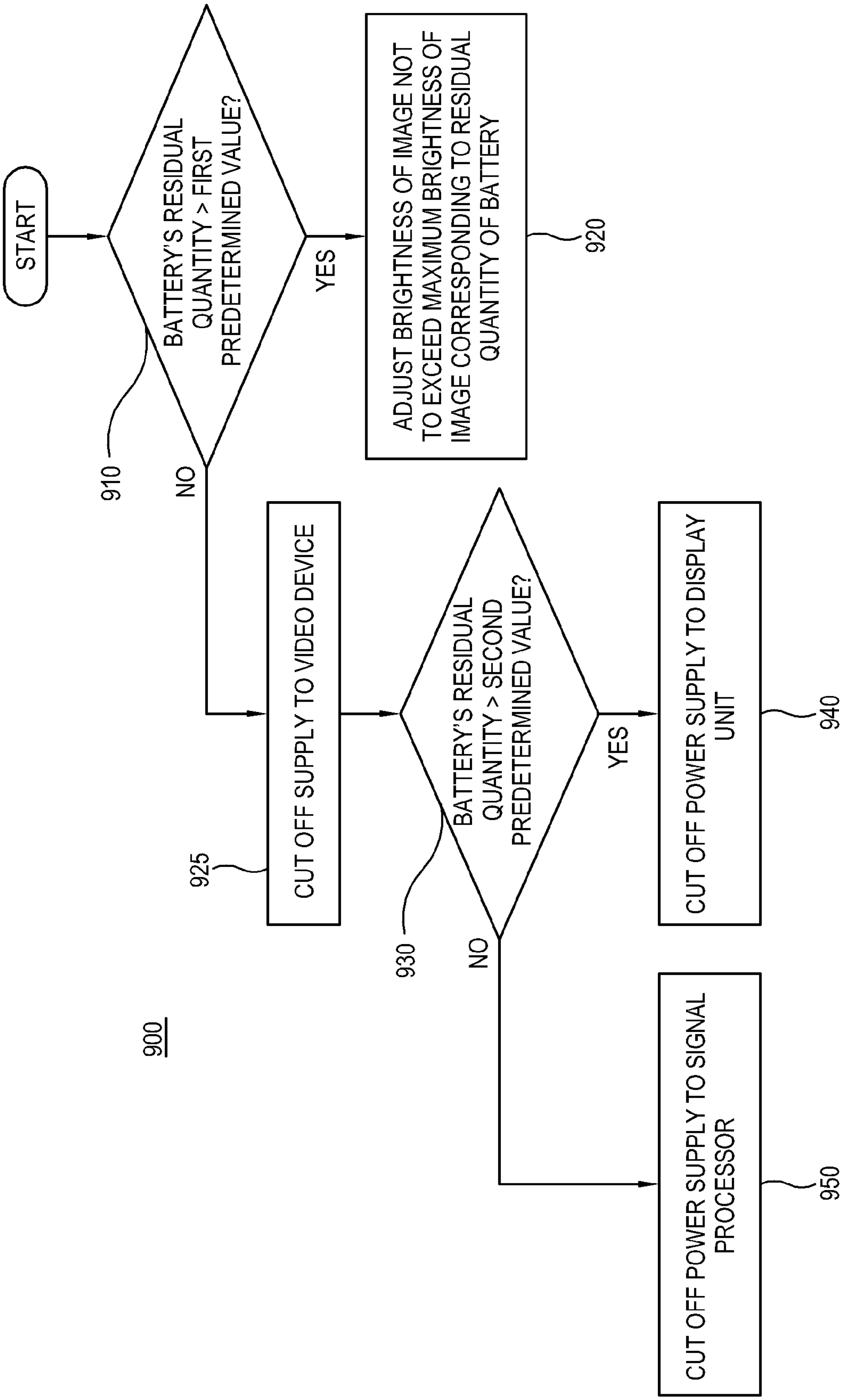
FIG. 4 is a flowchart of a method for adjusting the brightness of an image in accordance with a residual quantity of a battery unit according to an exemplary embodiment.

FIG. 4 is a flowchart illustrating a method of adjusting the brightness of an image based on the amount of battery power left in the battery unit 400 according to an exemplary embodiment.

Referring to FIG. 4, the operation 900 of adjusting the brightness of an image based on the amount of battery power left in the battery unit 400 (described with reference to FIG. 3) includes the following operations. First, the residual quantity of the battery unit 400 is compared with a first critical quantity at operation 910. For example, the first critical quantity may be critical quantity for only an audio mode. In other words, if the residual quantity of the battery unit 400 is equal to or lower than the first critical quantity, the power supplied to the video device is cut off and only the audio device is operated at operation 925.

If the residual quantity of the battery unit 400 is greater than the first critical quantity, the video device as well as the audio device are operable so that the brightness of an image on the display unit 200 can be adjusted not to exceed the maximum brightness of an image (the PWM duty stored in the lookup table) corresponding to the residual quantity of the battery unit 400 at operation 920.

If the residual quantity of the battery unit 400 is equal to or lower than the first critical quantity, it is compared with the second critical quantity at operation 930. The second critical quantity refers to the minimum quantity needed for operating with the power of the battery unit 400. If the residual quantity of the battery unit 400 is larger than the second critical quantity, the power supply to the display unit 200 is cut off at operation 940. At this time, the power supplied to the backlight unit 210 and the display panel 220 included in the display unit 200 may be individually shut off. If the residual quantity of the battery unit 400 is equal to or lower than the second critical quantity, the display apparatus 1 cannot operate any more with the power of the battery unit 400. At this time, the power supplied to the signal processor 100 is shut off, so that even an audio signal output from the signal processor 100 to the audio device (not shown) is cut off, thereby stopping all operations of the display apparatus 1 at operation 950.

Figure 5:
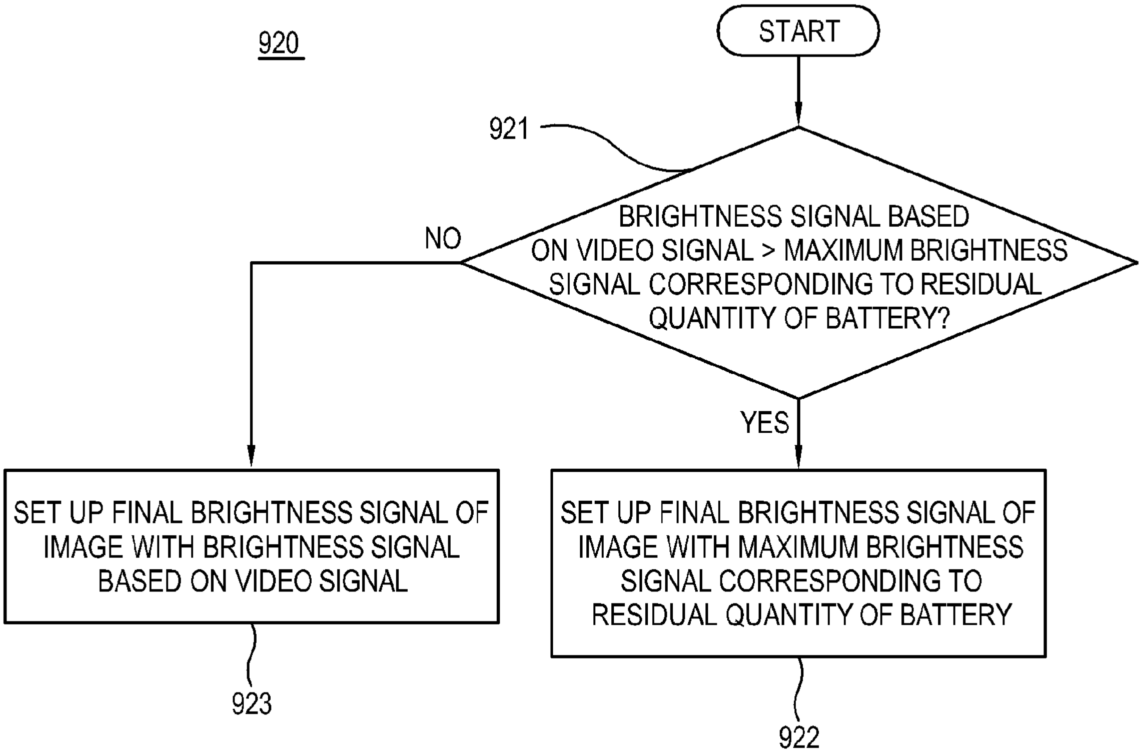
FIG. 5 is a flowchart of a method for adjusting the brightness of an image not to exceed the maximum brightness of an image corresponding to the residual quantity of the battery unit according to an exemplary embodiment.

FIG. 5 is a flowchart illustrating a method of adjusting the brightness of an image not to exceed the maximum brightness of an image corresponding to the residual quantity of the battery unit 400 according to an exemplary embodiment.

Referring to FIG. 5, the operation of adjusting the brightness of an image not to exceed the maximum brightness of an image of an image corresponding to the residual quantity of the battery unit 400 includes the following operations. First, the brightness signal based on the video signal received from the signal processor 100 is compared with the maximum brightness signal corresponding to the residual quantity of the battery unit 400, i.e., the maximum brightness information of an image referred to in the lookup table of the storage unit 500 at operation 921. If the brightness signal based on the video signal is greater than the maximum brightness signal corresponding to the residual quantity of the battery 400, the brightness of light in the backlight unit 210 is controlled so that the final brightness of the image cannot exceed the maximum brightness of an image set up in the lookup table, at operation 922. If the brightness signal based on the video signal received from the signal processor 100 is equal to or lower than the maximum brightness signal corresponding to the residual quantity of the battery unit 400, the final brightness of an image is set to correspond to the brightness signal based on the video signal received from the signal processor 100, at operation 923. Eventually, in either case, the final brightness of light in the backlight unit 210 does not exceed the maximum brightness of an image referred to in the lookup table.

Figure 6:
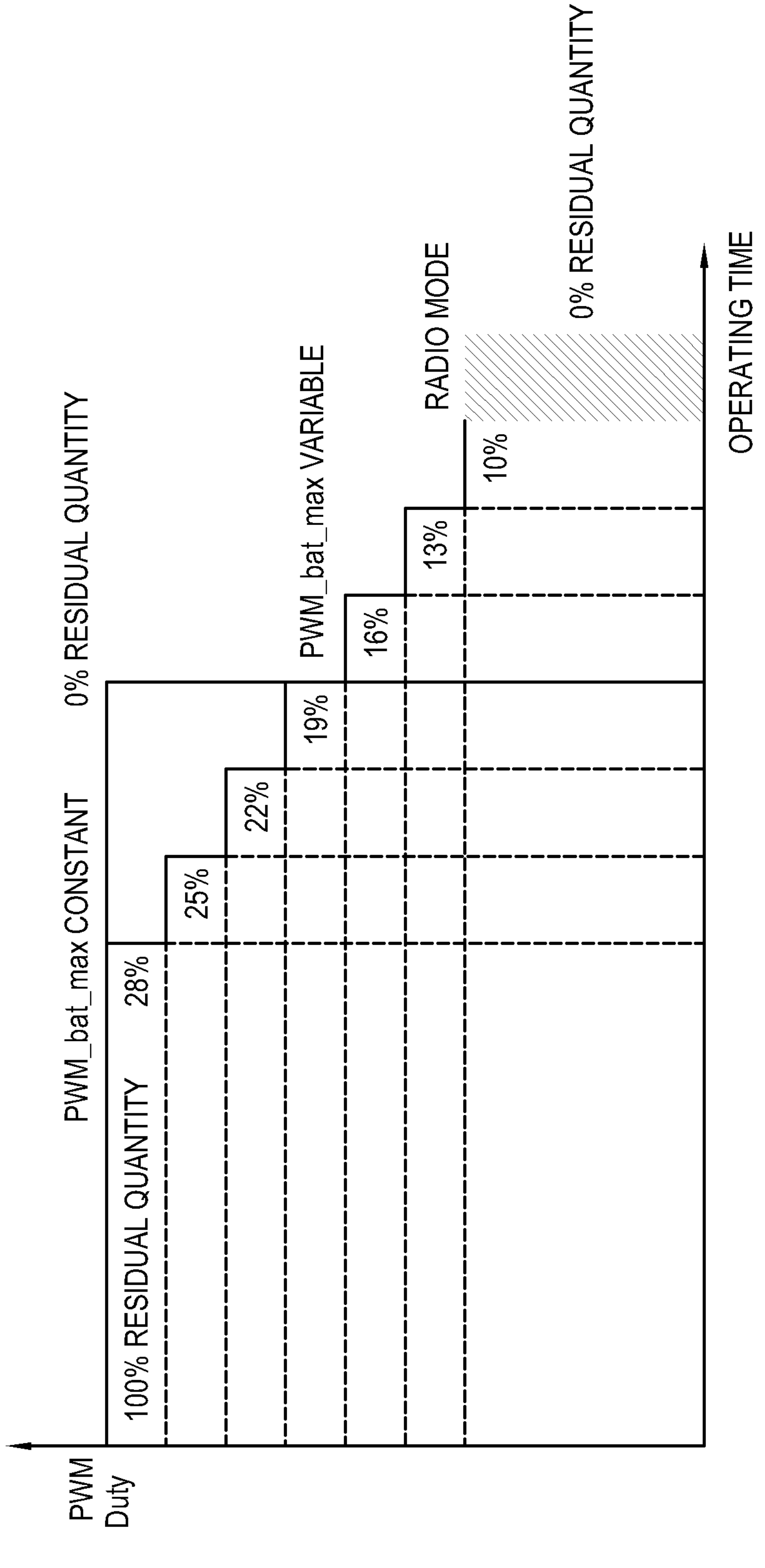
FIG. 6 is a graph showing a relationship between pulse width modulation (PWM) duty and the operating time according to an operating method of the battery unit according to an exemplary embodiment.
Figure 7:
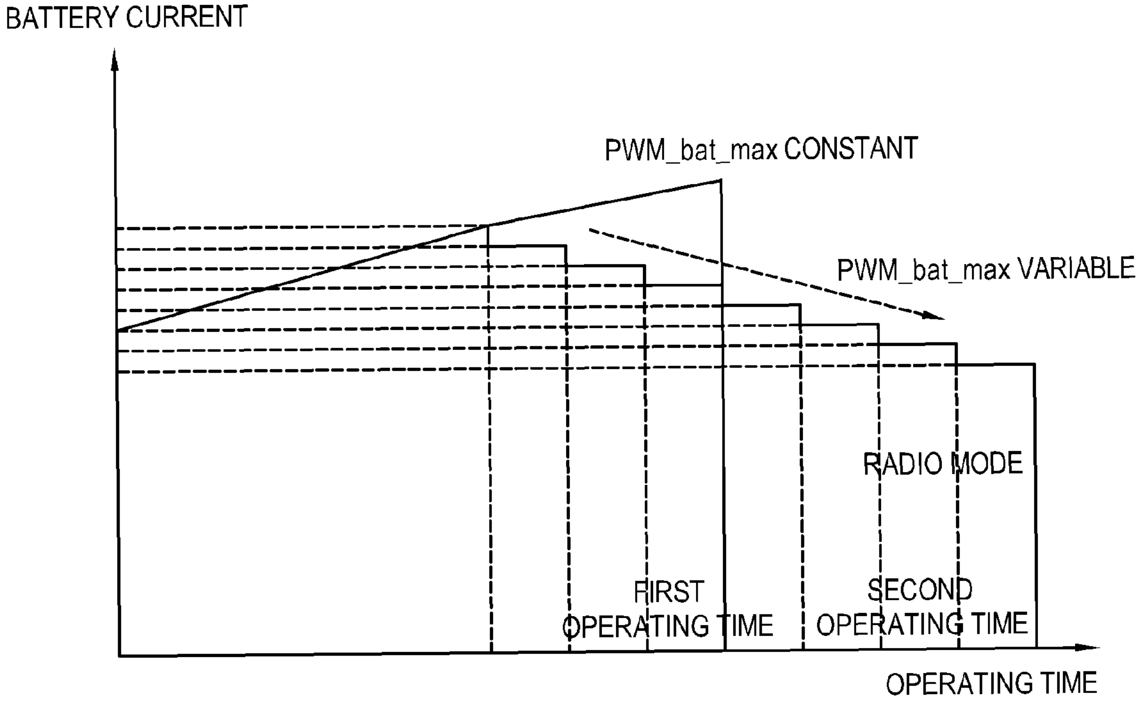
FIG. 7 is a graph showing a relationship between a battery current and the operating time according to the operating method of the battery unit according to an exemplary embodiment.

FIG. 6 is a graph showing a relationship between pulse width modulation (PWM) duty and the operating time according to an operating method of the battery unit 400 according to an exemplary embodiment, and FIG. 7 is a graph showing a relationship between a battery current and the operating time according to the operating method of the battery unit 400 according to an exemplary embodiment.

Referring to FIG. 6, if the maximum brightness signal PWM_bat_max for a battery mode (i.e., in the case of supplying the auxiliary power instead of the main power) is constant regardless of the residual quantity of the battery unit 400, the display apparatus 1 stops operating since the residual quantity of the battery unit 400 becomes 0% at a first operating time. On the other hand, if the maximum brightness signal PWM_bat_max of the battery mode is variable, in other words if the maximum brightness signal PWM_bat_max decreases in accordance with decrease of the residual quantity of the battery unit 400, the display apparatus 1 can operate for a longer period of time. In this case, the residual quantity of the battery unit 400 becomes the critical quantity (10%) for an audio mode, the video device is powered off and only the audio device operates.

Referring to FIG. 7, if the maximum brightness signal PWM_bat_max for the battery mode is constant, a current of the battery unit 400 is continuously consumed as time goes by and thus the display apparatus 1 stops operating since the residual quantity of the battery unit 400 becomes 0%. On the other hand, if the maximum brightness signal PWM_bat_max decreases as time goes by, a ratio of the current consumed in the battery unit 400 decreases at a certain ratio as time goes by, so that the current consumption in the battery unit 400 can more slowly proceed than that in the case where the maximum brightness signal PWM_bat_max for the battery mode is constant, thereby operating the display apparatus 1 for a longer period of time.

As described above, there are provided a display apparatus and a control method thereof, in which the brightness of an image is adjustable in accordance with the residual quantity of a battery so that an operating time of the display apparatus can be extended within a limited battery quantity, and the operating time of the display apparatus is additionally extended by operating only an audio device without a video device when the residual quantity of the battery decreases to a predetermined level.

Although a few exemplary embodiments have been shown and described, it will be appreciated by those skilled in the art that changes may be made in these exemplary embodiments without departing from the principles and spirit of the invention, the scope of which is defined in the appended claims and their equivalents. The exemplary embodiments should be considered in descriptive sense only and not for purposes of limitation. Therefore, the scope of the invention is defined not by the detailed description of exemplary embodiments but by the appended claims, and all differences within the scope will be construed as being included in the present invention.

What is claimed is:

1. A display apparatus comprising:
a display unit which displays an image based on a video signal;
a battery unit which supplies battery power;
a controller which adjusts brightness of the image in accordance with residual quantity of the battery unit when the battery power is supplied; and
a signal processor which processes the video signal,
wherein the display unit displays the image based on the video signal processed by the signal processor,
wherein the controller controls main power supplied to the signal processor and the display unit,
wherein the battery power assists the main power,
wherein the display unit comprises a backlight unit which provides light for displaying the image, and
wherein the controller controls backlight unit to adjust the brightness of the image.

2. The display apparatus according to claim 1, wherein the controller decreases the brightness of the image if the residual quantity of the battery unit is equal to or lower than a predetermined value.

3. The display apparatus according to claim 1, wherein the controller controls the battery power if the main power is cut off.

4. The display apparatus according to claim 1, wherein if the residual quantity of the battery unit is equal to or lower than a first predetermined value, power supplied to the display unit is shut off.

5. The display apparatus according to claim 1, further comprising a storage unit which stores a lookup table with information about the brightness of the image based on the residual quantity of the battery unit,
wherein the controller adjusts the brightness of the image with reference to the lookup table.

6. The display apparatus according to claim 5, wherein the information about the brightness of the image comprises information about maximum brightness of the image, and wherein the controller controls the brightness of the image not to exceed the maximum brightness based on the information about the maximum brightness of the image.

7. A display apparatus comprising:
a display configured to display an image based on a video signal;
a battery configured to supply battery power;
a controller configured to adjust brightness of the image in accordance with residual quantity of the battery then the battery power is supplied,
wherein the display comprises:
a backlight unit which provides light for displaying the image; and
a display panel which displays the image, and
wherein the controller individually shuts off power supplied to the backlight unit and the display panel.

8. A display apparatus comprising:
a display unit which displays an image based on a video signal;
a battery unit which supplies battery power;
a controller which adjusts brightness of the image in accordance with residual quantity of the battery unit when the battery power is supplied; and
a signal processor which processes the video signal;
wherein if the residual quantity of the battery unit is equal to or lower than a first predetermined value, power supplied to the display unit is shut off,
wherein the display unit displays the image based on the video signal processed by the signal processor,
wherein the controller control main power supplied to the signal processor and the display unit,
wherein the battery power assists the main power, and
wherein the controller cuts off power supplied to the signal processor if the residual quantity of the battery is equal to or lower than a second value which is lower than the first predetermined value.

9. The display apparatus according to claim 8, wherein the signal processor further processes an audio signal and wherein if the residual quantity of the battery is below the first predetermined value, the video image is shut off and the audio is played.

10. A method of controlling a display apparatus, the method comprising:
supplying battery power to a display unit as auxiliary power;
supplying main power to a signal processor and the display unit;
adjusting brightness of an image on the display unit based on residual quantity of a battery unit; and
processing a video signal by the signal processor,
wherein the display unit displays the image based on the processed video signal,
wherein the battery power assists the main power,
wherein light for displaying the image is provided by a backlight unit of the display unit, and
wherein the brightness of the image is adjusted by the backlight unit.

11. The control method according to claim 10, wherein the brightness of the image is decreased if the residual quantity of the battery unit is equal to or lower than a predetermined value.

12. The control method according to claim 10, wherein the battery power supplied to the display unit is controlled if the main power is cut off.

13. The control method according to claim 10, wherein if the residual quantity of the battery unit is equal to or lower than a predetermined first value, power supplied to the display unit is shut off.

14. The control method according to claim 10, wherein a controller adjusts the brightness of the image based on information in a lookup table and wherein the information comprises information about the brightness of the image based on the residual quantity of the battery unit.

15. The control method according to claim 14, wherein the information about the brightness of the image comprises information about maximum brightness of the image, and the brightness of the image is controlled not to exceed the maximum brightness based on the information about the maximum brightness of the image.

16. A method of controlling a display apparatus, the method comprising:
supplying battery power to a display as auxiliary power; and
adjusting brightness of an image on the display based on residual quantity of a battery;
wherein light for displaying the image is provided by a backlight unit of the display,
wherein the image is displayed by a display panel of the display,
wherein power supplied to the backlight unit and the display panel is individually shut off.

17. A method of controlling a display apparatus, the method comprising:
supplying battery power to a display as auxiliary power; and adjusting brightness of an image on the display based on residual quantity of a battery, wherein if the residual quantity of the battery is equal to or lower than a predetermined first value, power supplied to the display is shut off, and wherein if the residual quantity of the battery is equal to or lower than a second value lower than the first predetermined value, power supplied to a signal processor is cut off.

18. The control method according to claim 17, further comprising supplying main power to a signal processor and the display, wherein the signal processor further processes an audio signal.

19. A display apparatus comprising:

a display configured to display an image based on a video signal;

a battery configured to supply battery power; and a controller configured to adjust brightness of the image in accordance with residual quantity of the battery when the battery power is supplied, wherein, if the residual quantity of the battery is below a predetermined value, the controller is configured to shut off a power supplied to the display and play an audio corresponding to the video signal.

* * * * *